United States Patent [19]

Roley et al.

[11] 4,195,852
[45] Apr. 1, 1980

[54] END FACE SEAL ASSEMBLY

[75] Inventors: Robert D. Roley, Peoria; James R. Sturges, Washington, both of Ill.

[73] Assignee: Caterpillar Tractor Co., Peoria, Ill.

[21] Appl. No.: 875,490

[22] Filed: Feb. 6, 1978

[51] Int. Cl.$^2$ .............................................. F16J 15/38
[52] U.S. Cl. ........................................ 277/92; 305/11; 277/96.2
[58] Field of Search ................. 277/92, 96.2, 215, 81, 277/83; 305/11

[56] References Cited

U.S. PATENT DOCUMENTS

| | | |
|---|---|---|
| 2,289,274 | 7/1942 | Krug . |
| 2,814,513 | 11/1957 | Kupfert et al. . |
| 2,871,039 | 1/1959 | Payne . |
| 3,135,128 | 6/1964 | Rudolph ............................ 277/96.2 |
| 3,185,488 | 5/1965 | Christensen et al. . |
| 3,241,843 | 3/1966 | Hatch et al. ......................... 277/92 |
| 3,241,844 | 3/1966 | Morley ................................. 277/92 |
| 3,291,494 | 12/1966 | Hatch et al. ......................... 277/92 |
| 3,841,718 | 10/1974 | Reinsma .............................. 305/11 |
| 3,940,154 | 2/1976 | Olsson ................................ 277/92 |
| 4,066,269 | 1/1978 | Linne ................................. 277/228 |
| 4,089,531 | 5/1978 | Roley et al. ......................... 277/92 |
| 4,094,516 | 6/1978 | Morley et al. ....................... 277/215 |
| 4,132,418 | 1/1979 | Roli .................................... 277/91 |

FOREIGN PATENT DOCUMENTS 2631296 3/1977 Fed. Rep. of Germany .
1232314 9/1968 United Kingdom .

*Primary Examiner*—Robert I. Smith
*Attorney, Agent, or Firm*—Charles E. Lanchantin, Jr.

[57] ABSTRACT

An end face seal assembly has a seal ring of a first material, a support ring of a second material and a load ring of a third material serially connected together. The first material has a higher durometer scale hardness than the third material, and the second material is different and has greater rigidity than the first and third materials. The seal assembly has a preselected geometric relationship in use in a severe service environment rotary joint.

24 Claims, 6 Drawing Figures

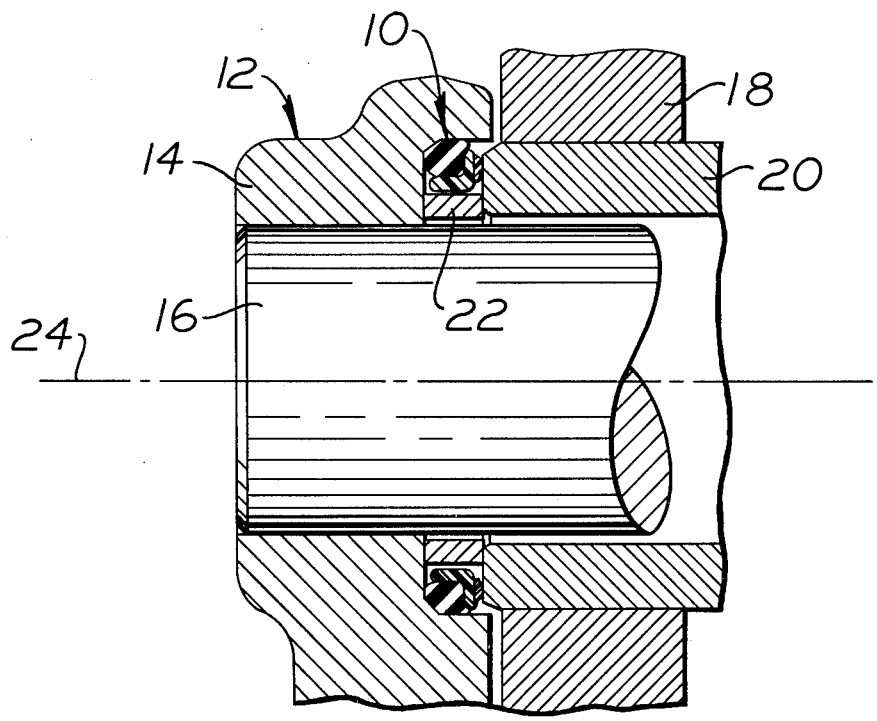
Fig-1-
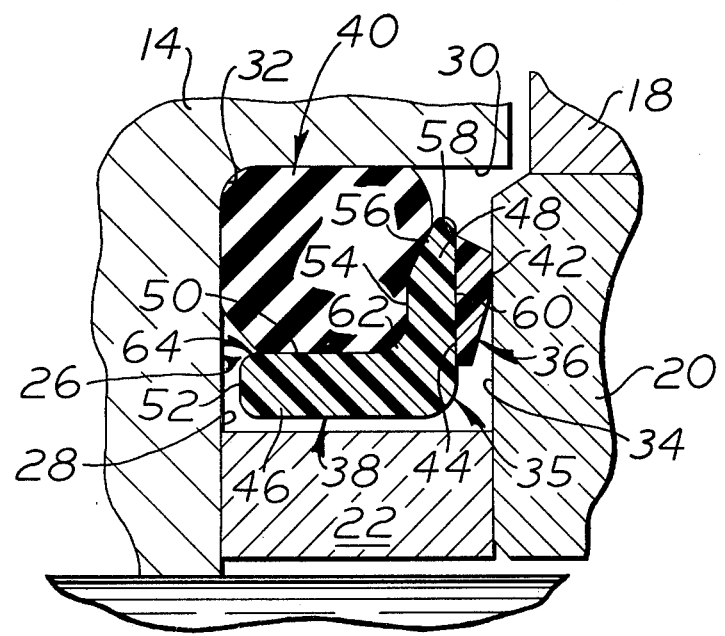
Fig-2-

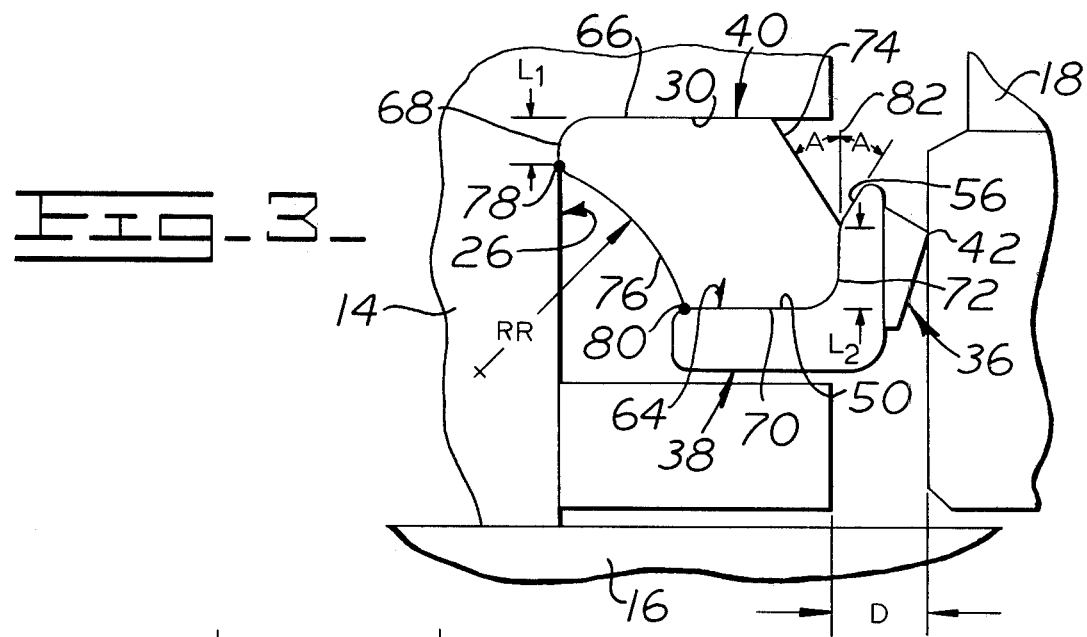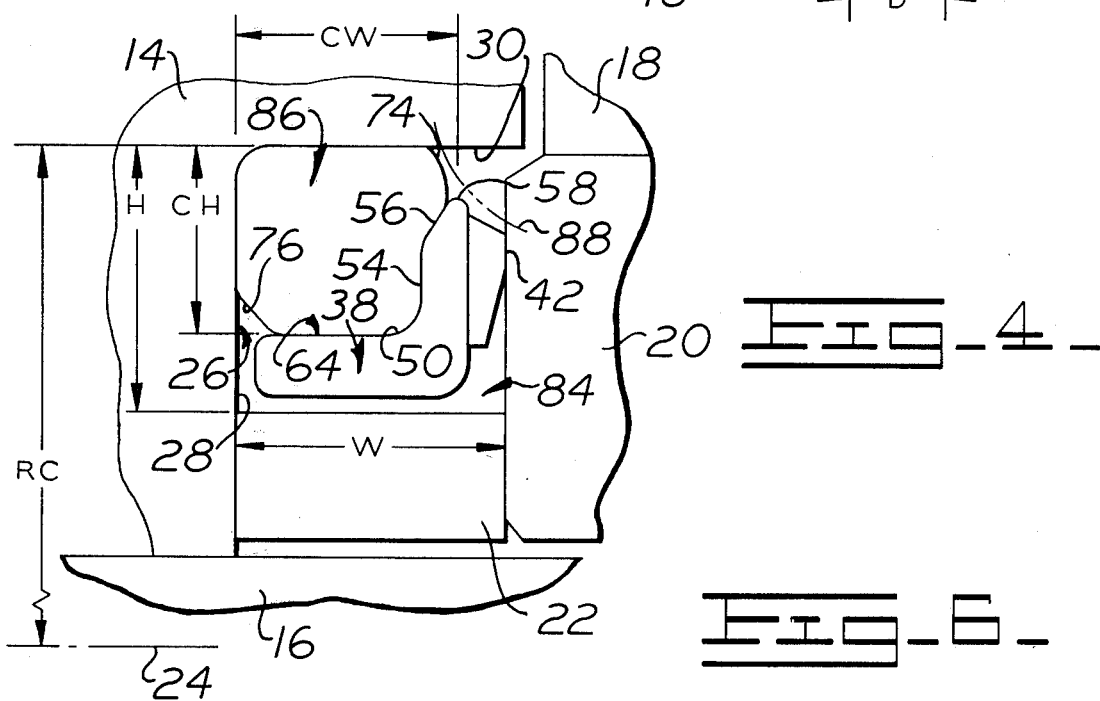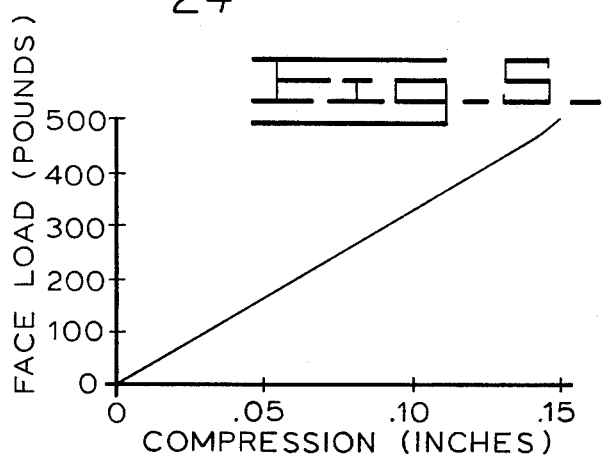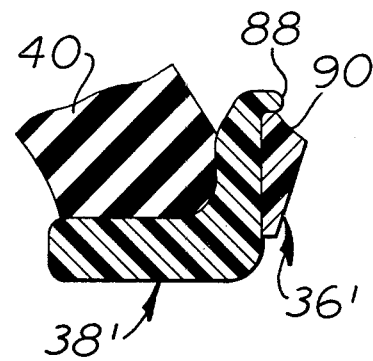

END FACE SEAL ASSEMBLY

BACKGROUND OF THE INVENTION

This invention relates generally to an end face seal assembly, and more particularly to a compact end face seal assembly having improved service life and load deflection characteristics for use in a severe service environment such as a track joint.

Extensive development work has been directed toward improving end face seals for protecting the pin joints of an endless track chain. Such track chains operate in extremely abrasive environments under all types of weather conditions. Consequently, the axial face load of the seals must be maintained at a substantial level, for example above about 100 pounds (445 N), while the seals experience a considerable amount of axial motion between the track joint members. This imposes substantial demands upon the materials that are utilized in the seal, since the seal must not only be sufficiently resilient to follow rapid movements of the joint members over a considerable temperature range, but must also exhibit a substantial wear life in order to retain lubricant within the joint and to exclude dirt.

For the most part, prior art seals have proven only partially satisfactory toward solving the aforementioned problems. One solution includes an elastomeric load ring in combination with an abrasive-resistant annular sealing element. The load ring is seated within a counterbore in the track link and applies a substantially axial load upon the sealing element to engage it against the end face of the associated bushing. In such location space is at a premium, so that the radial and axial dimensions of the chamber in which the seal is received impose restrictive limitations upon the geometric construction of the seal. As a result of these limitations the seal either does not perform in a desirably effective manner throughout the deflection range or exhibits a less than desirable service life.

Still another problem with the prior art seals is that many present one or more exterior grooves in which mud and ice can collect so that the operation and responsiveness of the seals is less than desirable. Still other seals have sharp grooves or notches in the elastomeric material which result in strain discontinuities and a less than desirable fatigue life in the elastomeric material.

In view of the above, it would be advantageous to provide a simple and compact end face seal assembly having long life expectancy and operational effectiveness over a wide range of deflection in the severe service environment of a track joint, and which seal assembly will overcome the problems associated with the prior art.

SUMMARY OF THE INVENTION

The present invention is directed to overcoming one or more of the problems as set forth above.

According to the present invention this is accomplished by providing an end face seal assembly having a seal ring, a support ring and load ring of preselected different materials in order to capitalize on the superior performance properties of each. Particularly, the material of the seal ring has a higher durometer hardness level than the material of the load ring for an extend wear life, the support ring has a greater rigidity than the seal ring and load ring, and the load ring has desirable resiliency.

Advantageously, the load ring and the support ring have a precise geometric relationship to each other and to the joint member in which they are received. For example, the cross section of the load ring has precisely defined interior and exterior surfaces to allow desirable deformability under compression.

DESCRIPTION OF THE DRAWINGS

FIG. 1 is a diagrammatic, fragmentary plan view in section showing details of construction of one end of a track joint incorporating an end face seal assembly constructed in accordance with the present invention.

FIG. 2 is a diagrammatic and greatly enlarged fragmentary view of the seal assembly and associated members shown in FIG. 1 to better show details of construction thereof.

FIG. 3 is a simplified diagrammatic cross sectional view of the seal assembly and associated members shown in FIG. 1, only showing the seal assembly in a first relatively free or unloaded position.

FIG. 4 is a view like FIG. 3 only showing the seal assembly in a second fully loaded or compressed position.

FIG. 5 is a graph illustrating the preselected relationship between the face load of the seal assembly of FIG. 1-4 and the axial deflection thereof.

FIG. 6 is a diagrammatic and fragmentary view of an alternate embodiment end face seal assembly.

DETAILED DESCRIPTION

The end face seal assembly 10 of the present invention is shown in FIG. 1 in the environment of a rotary track joint 12 such as is utilized in the endless track chain of a track-type vehicle. In a conventional manner, each of the plurality of track joints utilized in the track chain includes a first link member 14 and a pin 16 secured thereto, a second link member 18 and a cylindrical bushing 20 secured thereto, and a metallic spacer ring 22. In operation, the first link member and the pin rotate on a central axis 24 as a unit with respect to the second link and the bushing.

As shown in greater detail in FIG. 2, a counterbore or seat 26 is formed in the first link member 14 and is defined by an axially outwardly-facing end face 28, a cylindrical surface 30 and a blended arcuate corner portion 32. Moreover, the bushing 20 provides an axially inwardly facing end face 34. The spacer ring 22 is loosely received on the pin 16 and is adapted to abut both the faces 28 and 34 and limit the minimum axial distance therebetween as is known in the art. In this regard, cross reference is made to U.S. Pat. No. 3,841,718 issued to H. L. Reinsma on Oct. 15, 1974, for further reference to the construction of the track chain itself.

The end face seal assembly 10 is disposed within the counterbore 26 and axially seals against the end face 34 of the bushing 20 to retain lubricant within the track joint 12 and to prevent the entry of dirt or deleterious matter into the area between the pin 16 and the bushing. For this purpose the illustrated embodiment end face seal assembly has a seal ring means 35 including a resilient seal ring 36 for dynamic primary sealing engagement with the end face 34 and a relatively rigid support ring 38 for holding the seal ring. The seal assembly further includes a resilient load ring 40 for solely supporting the support ring 38 and for static secondary sealing engagement with both the support ring 38 and the counter bore 26 of the first link member 14. Advantageously, the seal ring 36, the support ring 38, and the load ring 40 are serially arranged in the counterbore 26 and have a construction such that all are disposed generally concentrically of the axis 24.

More specifically, the seal ring 36 has a generally triangular cross section having an annular sealing lip or axial outward face 42 that extends axially therefrom to engage the bushing end face 34. The seal ring 36 also has an annular base 44 which may be securely bonded or otherwise connected to the support ring 38. The seal ring 36 is preferably of a first resilient material having a durometer "D" scale hardness magnitude of at least 30. Most desirably, the first material is an elastomer having a durometer "D" scale hardness magnitude in a range of about 40 to 50. Preferably further, the elastomer is a nonrigid thermoplastic polyester based urethane rubber having a tensile modulus magnitude (Youngs modulus) of approximately 21 MPa (3,000 psi) minimum.

As is clearly shown in FIG. 2, the support ring 38 has a generally L-shaped cross sectional configuration having a cylindrical portion 46 and an integrally connected radial portion 48. The cylindrical portion defines a cylindrical surface 50 and an axially inner end 52, and the radial portion defines an axially inwardly-facing end face 54, a radially outwardly-inclined peripheral surface 56 extending from the end face, a radially outer peripheral edge 58, and an axially outwardly-facing end face or seat 60. It is to be noted that the base 44 of the seal ring 36 is autogenously bonded or otherwise sealingly secured to the end face 60 of the support ring. Moreover, a blended arcuate corner portion 62 connects the surface 50 and the end face 54 to define a seat 64 that is conically inward and facingly opposite to the counterbore or seat 26 in the link member 14.

The support ring 38 is constructed of a relatively rigid second material for retaining concentricity with respect to the axis 24 and for maintaining a proper support and force transmitting relationship with respect to the seal ring 36. Preferably, the second material is an organic plastic rather than metal for formability, economy, anticorrosion purposes, and ease of connection to the seal ring. Preferably further, the plastic is 40% glass reinforced polycarbonate having a relatively high impact strength, excellent thermal stability and a relatively high tensile modulus magnitude (Youngs modulus) of approximately 7000 MPa (1,000,000 psi) minimum.

The load ring 40 is preferably constructed of a third resilient material having a durometer "A" scale hardness magnitude in a range of about 40 to 70 and a relatively low tensile modulus magnitude (Youngs modulus) of approximately 3 MPa (500 psi). Preferably further, the third material is an elastomer, for example nonrigid epichlorohydrin copolymer rubber, to provide a relatively rapid rate of resiliently yielding, deflecting and returning. In this regard, and as used herein, the terms "rigid" and "nonrigid" have a precise meaning such as is set forth in ASTM Designation D883-75a pertaining to standard definitions of terms relating to organic plastics. Particularly, "rigid" refers to a modulus of elasticity in tension of a magnitude greater than 700 MPa (100,000 psi) and "nonrigid" refers to a similar modulus of a magnitude not over 70 MPa (10,000 psi). With these definitions in mind the load ring 40 may be referred to as a nonrigid plastic, the support ring 38 as a rigid plastic, and the seal ring 36 as a nonrigid plastic.

Referring now to the construction of the load ring 40, best illustrated in FIG. 3 in a substantially unloaded first position, the free cross section thereof may be noted to have a cooperating outer peripheral surface 66 and an axially inner end face 68, an opposite cooperating inner peripheral surface 70 and an axially outer end face 72, a radially inwardly inclined exterior surface 74 connected between the outer peripheral surface and the outer end face, and an interior surface 76 connected to the inner end face 68 at a first edge 78 and connected to the inner peripheral surface 70 at a second edge 80.

Preferably, the outer peripheral surface 66 of the load ring 40 is cylindrical so that an interference fit is defined between that surface and the cylindrical surface 30 of the counterbore 26. Also, the inner peripheral surface 70 is cylindrical so that an interference fit is defined between that surface and the cylindrical surface 50 of the support ring 38. The load ring is solely connected to the counterbore and support ring by these interference fits, in other words without use of a binding agent, which fits are preferably defined in a range of about 0.5% to 2.0% of the diameters of the cylindrical surfaces 30 and 50 respectively.

A preferred construction parameter of the load ring 40 resides in the preselected geometry of the interior surface 76 when it is in a free or unloaded state. Such interior surface is predominantly characterized by a shallow arcuate recess extending between the first edge 78 and the second edge 80 as shown in FIG. 3. The shallow arcuate recess is formed by a revolved radius RR as indicated on the drawing having a length about equal to the least distance between the inner end face 68 and the inner peripheral surface 70 or about equal to the distance between the first and second edges 78 and 80. If the radius RR is too small, the load ring will buckle under substantial compression; if too large or if a conical or convex interior surface is provided the axial face load upon the seal ring 36 will increase undesirably fast because the remaining space is filled too rapidly. Consequently, the radius RR should preferably not be below 0.9 or above 1.25 times the aforementioned distances.

Another preferred construction parameter of the load ring 40 exists in the preselected geometry of the inclined exterior surface 74. Particularly, such exterior surface is defined by a portion of a right circular cone. It is of substantial significance to note that the inclined exterior surface 74 of the load ring 40 and the inclined peripheral surface 56 of the support ring 38 both define a preselected angle "A" with a plane 82 disposed transverse the central axis 24 and on opposed sides of the plane as is illustrated in FIG. 3. Specifically, the angle "A" is preferably defined within a range of about 28 to 38 degrees from the plane. If the angle "A" is below such value excessive deformation and strain is observed at the surface 74 under high load. On the other hand, if the angle "A" is above such range the surface 74 will not close against the surface 56 of the support ring and contaminants can get trapped therebetween.

Another preferred construction parameter of the load ring 40 exists in the preselected geometry of both the inner end face 68 and the outer end face 72 of the load ring 40. Preferably, the cross sectional contact length $L_2$ of the outer face as axially projected and radially measured is about 1½ to 2 times the corresponding contact length $L_1$ of the inner end face as is indicated in FIG. 3 and such contact lengths are radially offset to provide the desired shear loading and static sealing thereat.

Lastly, as shown in FIG. 4, a first compact chamber 84 having an axial width (W) and a radial height (H) is defined between the link member 14, the bushing 20 and the spacer ring 22 when the seal assembly 10 is in a fully compressed second position. In such position the link member 14 and the support ring 38 face each other in such a way that a second compact chamber 86 having an axial width CW and a radial height CH is defined within the first chamber between the load ring seats 26 and 64 respectively formed therein.

As the end face seal assembly 10 is axially compressed a preselected deflection distance D by relative axial movement of the first and second link members 14 and 18 from a first substantially unloaded position as shown in FIG. 3 to a second fully compressed position as shown in FIG. 4, the load ring 40 substantially fills the second chamber 86 thereby making maximum use of available space. Specific parameters of the instant example seal assembly, including the size of the chambers, are as follows:

EXAMPLE

| | | | |
|---|---|---|---|
| Radius of Counterbore (RC) | = | 46.2 mm | (1.817") |
| Radial Height of Chamber (CH) | = | 6.78 mm | (0.267") |
| Radial Height (H) | = | 9.85 mm | (0.388") |
| Compressed Axial Width (W) | = | 11.10 mm | (0.437") |
| Deflection (D) | = | 3.91 mm | (0.154") |
| Axial Width of Chamber (CW) | = | 8.66 mm | (0.341") |
| Radius of Recess (RR) | = | 9.00 mm | (0.354") |

The compact relationship of the instant embodiment seal assembly 10 is indicated by a preselected ratio of the axial deflection distance D between the aforementioned first and second positions to the radial height H of the first chamber 84 of at least 1:4. In the embodiment shown the ratio is about 4:10. This contrasts to corresponding prior art ratios of about 1:10. In other words, the total deflection distance D for the instant invention is in the range of about three times that of prior art while the radial height H is believed to be less than the prior art by about 30% or more.

In operation, the compact end face seal assembly 10 provides a gradually increasing axial face load on the sealing lip 42 as the load ring 40 is loaded in shear between the seats 26 and 64 and compressed between the first and second positions illustrated in FIGS. 3 and 4. The relationship is best illustrated by the graph in FIG. 5. Importantly, the face load is maintained at a minimum value of at least 100 pounds (445 N) upon the initial installation of the seal assembly in the track joint 12 in order to assure positive retention of lubricant in the region between the pin 16 and bushing 20 and to exclude the entry of foreign material. Note that the load/deflection rate is substantially a straight line up to a maximum value of about 440 pounds (1,957 N) as is limited by the axial width W of the spacer ring 22.

Attention is now directed to the contour change of the exterior surface 74 of the load ring 40 as the seal assembly 10 is compressed. Note that the exterior surface 74 is deformed in such a way that the conical shape becomes a convex shape in cross section as may be appreciated by joint reference to FIGS. 3 and 4. As the load ring is compressed the exterior surface engages the surface 30, the end face 54 and the inclined peripheral surface 56 with a desirable rolling motion that controls the gradually increasing internal strain rate and that function to extrude dirt. Moreover, in the FIG. 4 position, note that the external surface of the load ring is desirably supported by the peripheral surface 56 of the support ring 38 without any sharp increase in strain. Note further that the external surface, the peripheral edge 58 of the support ring and the external surface of the seal ring 36, present a smooth arc 88 in cross section as indicated in phantom in FIG. 4. This smooth arc defines a minimal region of accessibility for outside contaminates.

Simultaneously, as the load ring 40 is compressed the interior surface 76 rollingly engages the end face 28 of the link member 14 and also allows a controlled increase of the internal strain rate of the load ring. As shown in FIG. 4, the second chamber 86 is desirably substantially filled by the load ring. Specifically, the second chamber is at least 90 percent filled by the load ring in the position of maximum compression. This advantageously maximizes the use of minimal space and avoids weakening of the first link member 14 as would be the case with a counterbore 26 of larger dimensions.

An alternate embodiment end face seal assembly is shown in FIG. 6, which differs from the seal assembly previously described solely by the seating and support construction of the resilient seal ring 36' on the support ring 38'. Specifically, the support ring is modified to incorporate an annular retaining lip 88 and the seal ring is modified to incorporate a contoured exterior surface 90. The cooperating relationship between the axially overextending retaining lip 88 and the entrapped contoured exterior surface 90 is such as to provide increased containment of the radially outer peripheral portion of the seal ring 36. This increased support reduces the tendency for separation between the seal ring and the support ring under heavy loading.

It is thus apparent that the present invention provides an effective and extremely compact end face seal assembly for a severe service environment such as is found in a rotary track joint, but which seal assembly would be useful in a variety of other applications as well. It is simple and reliable in construction, and upon being compressed includes a load ring that controllably distorts to minimize internal stress therein while providing a gradually increasing face load on the sealing lip. Such distortion is controlled by precise geometric relationships between the juxtaposed and conforming elements, and also the use of three different materials for the seal ring 36, the support ring 38 and the load ring 40. By using three materials having preselected physical characteristics, each portion of the seal can be constructed to be most effective. For example, the relatively high tensile modulus or high rigidity level of the reinforced polycarbonate plastic of the support ring serves to prevent any rotational movement of the support ring in cross section so that the sealing lip 42 will continually contact the end face 34 in an axial direction. Moreover, the material of the seal ring 36 is importantly maintained at a higher durometer hardness than the load ring 40 to maintain maximum wear life. Still further, the material of the load ring has a rate of resiliently yielding, deflecting and returning that is greater or faster than the corresponding rate of the material of the seal ring and a lower durometer hardness scale reading than that of the seal ring to maximize the responsiveness of the seal assembly.

Other aspects, objects and advantages will become apparent from a study of the specification, drawings and appended claims.

The embodiments of the invention in which an exclusive property or privilege is claimed are defined as follows:

1. An end face seal assembly (10) having an axis (24), comprising:

seal ring means (36) of a first material having a hardness magnitude in a range of about 40–50 on the durometer "D" scale for sealing, said seal ring means (36) having an annular axially outwardly facing sealing lip (42);

support ring means (38) of a second relatively rigid material for holding said seal ring means (36), said support ring means (38) having a generally L-shaped cross sectional configuration; and load ring means (40) of a third material having a hardness magnitude in a range of about 40–70 on the durometer "A" scale for sealingly engaging, supporting, and solely urging said support ring means (38) in an axial direction when compressed, said seal ring means (36), support ring means (38) and load ring means (40) being disposed generally concentrically on said axis (24), said first material being different than said third material, and said second material being different and having greater rigidity than said first and third materials.

2. The end face seal assembly (10) of claim 1 wherein said first material is a thermoplastic polyester based urethane rubber.

3. The end face seal assembly (10) of claim 1 wherein said second material is an organic plastic.

4. The end face seal assembly (10) of claim 3 wherein said plastic is reinforced polycarbonate.

5. The end face seal assembly (10) of claim 1 wherein said third material is epichlorohydrin copolymer rubber.

6. The end face seal assembly (10) of claim 1 including:
  a first member (14) having an axially outwardly facing counterbore (26) having a cylindrical surface (30); and
  a second member (20) having an axially inwardly facing surface (34), said seal ring means (36) sealingly engaging said surface (34), said load ring means (40) being located in said counterbore (26).

7. The end face seal assembly (10) of claim 6 wherein said first material is an elastomer, said second material is an organic plastic, and said third material is an elastomer.

8. The end face seal assembly (10) of claim 6 wherein said first material is urethane rubber, said second material is reinforced polycarbonate, and said third material is copolymer rubber.

9. The end face seal assembly (10) of claim 1 wherein said seal ring means (36) is of generally triangular cross sectional configuration and said support ring means (38) has an annular retaining lip (88) axially overextending and peripherally containing said seal ring means (36).

10. An end face seal assembly (10), comprising:
  a support ring (38) of generally L-shaped cross sectional configuration defining first and second seats (60, 64) on the axially opposed sides thereof, said support ring (38) having a radially outwardly inclined peripheral surface (56) and being of a rigid plastic;
  a seal ring (36) connected to said first seat (60) of the support ring (38) and being of a resiliently deflectable elastomeric material; and
  a load ring (40) having a radially inwardly inclined exterior surface (74), said load ring (40) being releasably connected to said second seat (64) of the support ring (38), being of a resiliently deflectable elastomeric material having a greater rate of yielding, deflecting and returning than said elastomeric material of said seal ring, and being so constructed and arranged that in response to axial loading said radially inwardly inclined exterior surface (74) deflects and is supported by said radially outwardly inclined peripheral surface (56) of said support ring (38).

11. The end face seal assembly (10) of claim 10 including an axis (24), a plane (82) transverse to said axis (24), and wherein said inclined peripheral surface (56) of the support ring (38) and said inclined exterior surface (74) of the load ring (40) both define a preselected angle A with respect to said plane (82) on opposed sides of said plane (82) in a substantially unloaded condition.

12. The end face seal assembly (10) of claim 11 wherein said angle A is in a range of about 28 degrees to 38 degrees.

13. An end face seal assembly (10) located between a first member (14) having an axially outwardly facing seat (26) and a second member (20), said end face seal assembly (10) comprising:
  seal ring means (35) for axial sealing engagement with said second member (20), said seal ring means (35) having a generally L-shaped cross sectional configuration and a sealing lip (42), said section defining an axially inwardly facing seat (64) and a radially outwardly inclined peripheral surface (56); and
  load ring means (40) for resiliently supporting said seal ring means (35), said load ring means (40) having in cross sectional configuration a cooperating outer peripheral surface (66) and an axially inner end face (68) jointly located in said axially outwardly facing seat (26), an opposite cooperating inner peripheral surface (70) and an axially outer end face (72) jointly located in said axially inwardly facing seat (64), and a radially inwardly inclined exterior surface (74) connected between said outer peripheral surface (66) and said outer end face (72), said load ring means (40) being compressable from a first position to a second position in response to relative axial movement of said first and second members (14,20), said radially outwardly inclined peripheral surface (56) of said seal ring means (35) being in supporting contact with said radially inwardly inclined peripheral surface (74) of said load ring means (40) at said second position.

14. The end face seal assembly (10) of claim 13 wherein said inclined peripheral surfaces (56,74) are portions of a pair of oppositely facing right circular cones.

15. The end face seal assembly (10) of claim 13 including a central axis (24), a plane (82) transverse to said axis (24), and wherein said radially outwardly inclined peripheral surface (56) defines a preselected angle in a range of about 28 degrees to 38 degrees from said plane (82).

16. The end face seal assembly (10) of claim 13 including a central axis (24), a plane (82) transverse to said axis (24), and wherein said radially inwardly inclined peripheral surface (74) defines a preselected angle in a range of about 28 to 38 degrees from said plane (82).

17. An end face seal assembly (10) located between a first member (14) having an axially outwardly facing seat (26) defining a first substantially cylindrical surface (30) and a cooperating first end face (28), and a second member (20), said end face seal assembly (10) comprising:

seal ring means (35) for axial sealing engagement with the second member (20), said seal ring means (35) having an axially inwardly facing seat (64) defining a second substantially cylindrical surface (50) and a cooperating second end face (54); and load ring means (40) for resiliently supporting said seal ring means (35), said load ring means (40) having a cooperating outer peripheral surface (66) and an axially inner end face (68) jointly located in said axially outwardly facing seat (26), an opposite cooperating inner peripheral surface (70) and an axially outer end face (72) jointly located in said axially inwardly facing seat 64, and an interior surface (76) connected to said inner end face (68) at a first edge (78) and to said inner peripheral surface (70) at a second edge (80), said interior surface (76) being defined by a shallow arcuate recess defined by a revolved radius having a length within a range of 0.9 to 1.25 times the distance between said first and second edges (78,80).

18. A load ring (40) defined by a plurality of preselected surfaces concentrically disposed with respect to a central axis, said load ring (40) comprising:
   (a) a substantially cylindrical outer peripheral surface (66);
   (b) an axially inner end face (68) connected to said outer peripheral surface (70);
   (c) a substantially cylindrical inner peripheral surface (70);
   (d) an axially outer end face (72) connected to said inner peripheral surface (70);
   (e) an inclined exterior surface (74) connected between said outer peripheral surface (66) and said outer end face (72); and
   (f) an interior surface (76) connected between said inner peripheral surface (70) and said inner end face (68), said interior surface (76) being geometrically defined by a shallow arcuate recess defined by a revolved radius (RR) having a length within a range of 0.9 to 1.25 times the least distance between said inner end face (68) and said inner peripheral surface (70).

19. The load ring (40) of claim 18 wherein said load ring (40) is made of resilient elastomeric material having a hardness magnitude in a range of about 40 to 70 on the durometer "A" scale.

20. The load ring (40) of claim 18 wherein said load ring (40) is of epichlorohydrin copolymer rubber.

21. The load ring (40) of claim 18 wherein said inclined exterior surface (74) is defined by a portion of a right circular cone.

22. An end face seal assembly (10), comprising:
   a load ring (40) of resiliently deflectable elastomeric material;
   a support ring (38) having a generally L-shaped cross sectional configuration defining first and second seats (60,64) on the axially opposite sides thereof and having an annular retaining lip (88), said load ring (40) being connected to said second seat (64), and said support ring (38) being of relatively rigid material;
   a seal ring (36) connected to said first seat (60) and being of resiliently deflectable elastomeric material, said seal ring (36) having a preselected cross sectional configuration defining an annular axially outwardly facing sealing lip (42), said annular retaining lip (88) axially overextending and containing the radially outer peripheral portion of said seal ring (36).

23. The end face assembly (10) of claim 22 wherein said preselected cross sectional configuration of said seal ring (36) is generally triangular.

24. The end face seal assembly (10) of claim 22 wherein said seal ring (36) has a contoured exterior surface (90).

* * * * *